US005194584A

United States Patent [19]

Leahy

[11] Patent Number: 5,194,584

[45] Date of Patent: Mar. 16, 1993

[54] BIODEGRADABLE CONCRETE FORM RELEASE AGENT

[75] Inventor: Kenneth C. Leahy, Franklin Park, Ill.

[73] Assignee: Leahy-Wolf Co., Franklin Park, Ill.

[21] Appl. No.: 833,913

[22] Filed: Feb. 11, 1992

[51] Int. Cl.[5] .......................... C09D 5/20; C09K 3/18; B28B 7/36; B28B 7/38

[52] U.S. Cl. ........................................ 530/210; 106/2; 106/38.24; 106/38.25; 427/133; 427/134

[58] Field of Search ................. 530/210; 106/2, 38.24, 106/38.25; 249/205; 427/133, 134

[56] References Cited

U.S. PATENT DOCUMENTS

| | | | |
|---|---|---|---|
| 4,740,324 | 4/1988 | Schur | 252/56 R |
| 5,100,697 | 3/1992 | Nielsen | 427/134 |

*Primary Examiner*—Nathan M. Nutter
*Attorney, Agent, or Firm*—John J. Chrystal; John G. Premo; Timothy J. Keefer

[57] ABSTRACT

A small amount of tall oil uniformly dispersed in a vegetable oil is a superior concrete from release coating composition.

5 Claims, No Drawings

BIODEGRADABLE CONCRETE FORM RELEASE AGENT

SUMMARY OF THE INVENTION

Vegetable oils which contains a small amount of tall oil are superior concrete form release agents.

INTRODUCTION

Concrete release agents are applied to such solid surfaces as forms, pallets or any other surfaces which come into contact with fresh concrete. The ideal release agent, in addition to providing good stripability, should be non-staining. Also a good release agent should be non-corrosive to the surfaces to which it is applied or incidentally contacts.

Release agents should not react with the concrete thereby causing such problems as surface "kill". They should not promote formation of air pockets or cause interference with concrete coating treatments. Lastly, they should remain in the form of a free flowing liquid over a wide temperature range and should not separate under normal long term storage conditions.

Most prior art concrete release agents contain as a solvent or carrier petroleum based hydrocarbon liquids. These hydrocarbon solvents are known to cause dermatological problems if they contact the skin of a sensitive subject. Their use also threatens ground water supplies due to spillage, run off and over spray. Since spraying is a common method of applying concrete release agents prolonged breathing of the hydrocarbon oil mists can cause respiratory problems. Hydrocarbon solvents, in some instances, have a disagreeable odor.

If it were possible to provide a concrete form release agent which could provide all the worthwhile advantages now afforded by the better commercial products yet at the same time overcoming the disadvantages which are associated with release agents which contain petroleum based hydrocarbon liquids a major contribution to the art would be afforded.

Accordingly, the invention described herein comprises non-toxic, biodegradable components which have been brought together to form a product which displays not only superior results as a concrete form release agent in comparison to conventional agents, but is believed to be both non-toxic and biodegradable.

THE INVENTION

Broadly, the invention comprises a concrete form release agent free from any petroleum hydrocarbon liquids which comprises a vegetable oil carrier which contains dispersed uniformly therein from 1% to 8% by weight of tall oil. A preferred range for the tall oil is 3% to 8%. In another preferred embodiment of the invention the vegetable oil is Canola oil.

The invention is also directed to a method for allowing the ready release of concrete from surfaces in contact therewith by the expediency of coating such surfaces, prior to their contacting the concrete, with the compositions as described and claimed. The invention also relates to concrete forms which have their surfaces coated with the compositions.

THE VEGETABLE OIL

Any vegetable oil may be used. Canola oil is preferred. Canola oil is rape seed oil which has a low erucic acid content. Good quality Canola oils are available from CAP Foods. A preferred material is described as their Refined and Bleached Canola oil. Rape seed oil may be substituted for the Canola oil. Unsaturated fatty acids, their esters, free acids or salts which contain 16 or more carbon atoms may be substituted for the vegetable oils. Thus, oleic, linoleic and similar acid esters as well as their salts and in some instances the free fatty acids are considered to be equivalents to the vegetable oils from which most of these compounds are derived. The C18 and higher fatty acid derivatives are preferred.

THE TALL OIL

The tall oil can be any tall oil that is commercially available. A preferred species that may be used to advantage in the practice of the invention is sold by Arthur C. Trask Corp. under the trademark, Latol 28. The tall oil is completely miscible and is uniformly dispersed in the vegetable oil by means of simple mixing at room temperature. Whether a solution or dispersion is formed is not known. The finished products are stable and do not separate under extremes of temperature or under conditions of long term storage. Where extremely cold temperatures are encountered the addition of a cloud point depressant to the compositions may be desirable.

APPLYING THE COMPOSITIONS

The compositions of the invention are applied to solid surfaces of the type in contact with fresh concrete such as forms, molds and the like by means such as brushing, rolling or spraying. For most large scale applications spraying is the most common method of application. In the case of porous surfaces, such as previously uncoated wood, the surface should be billed or sealed. This may be accomplished by applying several coats of the compositions of the invention. When non-porous surfaces such as aluminum or ferrous metals represent the surfaces to be treated pre-coating is not required.

The compositions are applied neat in all cases. The thickness of the coatings will generally correspond to the thickness of a coat of household paint. A single coat of the compositions provides good release properties to the surfaces to which they have been applied for several uses before re-application is necessary.

ADVANTAGES OF THE INVENTION

The numerous advantages of the compositions of the invention which flow primarily from the vegetable oil carrier may be summarized as follows:

A) Non-staining
B) Easily blends with the tall oil
C) Stable shelf life
D) Easy to spray
E) Non-aggressive to plastics and synthetic rubber
F) Bio-degradable
G) Non-drying
H) Does not effloresce
I) Easily stripped from forms and molds
J) Non harmful vapor when sprayed

EVALUATION OF THE INVENTION

To evaluate the invention a composition was prepared which comprised 5% Latol 28 dispersed in refined and bleached Canola oil. When applied to a number of forms and molds as described above good release was achieved in all cases. There was evidence that where the composition had contacted metal parts they were protected from corrosion. There was little or no odor to the product and it was readily applied by using conventional spray equipment.

Since the compositions contain naturally occurring materials the danger of pollution or toxic episodes are not present as is the case when hydrocarbon oil carriers are employed.

The compositions are inexpensive. The materials from which they are commercially available.

Three concrete release agents were tested in comparison with the release agent of the present invention, the results were as follows:

EXAMPLES

Example 1

The release agent of Example 1 is manufactured by Nox-Crete Chemicals of Omaha, Nebraska and is sold under the name of NOX-CRETE FORM COATING. This agent is a solution of fatty materials in a light clear petroleum base.

It was observed that this agent showed a reactivity to synthetic compounds. For example staining and degrading were observed on styrene liner material.

The health reactivity of this petroleum based product produces an inherent dermal reaction potential.

Example 2

CRETE LEASE 727 from Cresset Chemical Co., Inc. of Weston, Ohio is a solution of a neutralized fatty acid dissolved in a mineral oil carrier.

The observed reactivity to synthetic compounds was noted to be poor. For example staining and degrading on styrene, and black rubber were observed.

Also the health reactivity of petroleum based products is well known (i.e., inherent dermal carcinogenicity and dermal reaction potential).

Example 3

W. R. Meadows, Inc. of Elgin, Ill. manufactures Sealtight Duogard which is a chemically inert nonreactive ingredient dissolved in a solvent base.

The observed reactivity to synthetic compounds was noted to be poor. Staining and degrading was noticed on all synthetic compounds that the fluid came in contact with.

Health reactivity as per manufacturer's specification warns "Avoid prolonged breathing of vapors which can cause dizziness or suffocation. Avoid prolonged contact with skin as contact with skin may irritate or burn skin and eyes."

The composition of the present invention displayed superior characteristics to the above mentioned commercially available release agents. More specifically, individuals applying the composition are not exposed to the same dermal irritation and cancer risks as those inherent in the petroleum base products. Further, when applying the concrete form release agent of the present invention one need not be concerned with exposure to vapors, or air-borne mist, when spraying is the method of application. With respect to the reactivity of this composition to the synthetic compounds mentioned in the Examples, it was noted that no staining or degrading of synthetic materials was observed. In fact as noted above, the composition actually provided protection from corrosion on most surfaces contacted.

While the term "concrete" has been used herein and in the claims it is to be understood that it includes cement from which concrete is made by the addition of aggregate.

Having thus described my invention it is claimed as follows:

1. A concrete form release agent free from any petroleum hydrocarbon liquid comprising a vegetable oil carrier which contains dispersed uniformly therein from 1% to 8% by weight of tall oil.

2. The release agent of claim 1 where the vegetable oil is Canola oil.

3. The release agent of claim 1 where the amount of tall oil is 3% to 8% by weight.

4. A method for improving the release of concrete from soil surfaces which comprises coating such surfaces prior to their contacting the concrete with a composition comprising a vegetable oil carrier which contains uniformly dispersed therein from 1% to 8% by weight of tall oil.

5. The method of claim 4 where the vegetable oil is Canola oil.

* * * * *